United States Patent

Walkup et al.

[15] 3,638,567

[45] Feb. 1, 1972

[54] METHOD OF PREPARING AND UTILIZING A GRAVURE PRINTING MASTER

[72] Inventors: Lewis E. Walkup; Rexford W. Jones, both of Columbus, Ohio

[73] Assignee: Xerox Corporation, Rochester, N.Y.

[22] Filed: May 13, 1969

[21] Appl. No.: 834,576

[52] U.S. Cl. ............................101/170, 101/471, 101/401.1, 96/1.3, 250/65 R

[51] Int. Cl. ..................B41m 1/10, B41m 5/00, G03g 13/06

[58] Field of Search ...............101/170, 395, 401.1, 426, 467, 101/470, 471; 355/17; 250/65.1; 96/1, 1.3, 1.5

[56] References Cited

UNITED STATES PATENTS

| | | | |
|---|---|---|---|
| 2,338,558 | 1/1944 | Hickwire | 101/170 X |
| 3,230,875 | 1/1966 | Newman | 101/471 |
| 3,445,226 | 5/1969 | Gundlach et al. | 101/401.1 |
| 3,512,968 | 5/1970 | Tulagin | 96/1.3 |
| 3,438,772 | 4/1969 | Gundlach | 96/1.3 |

*Primary Examiner*—William B. Penn

*Attorney*—James J. Ralabate, Donald C. Kolasch and Albert A. Mahassel

[57] ABSTRACT

There is disclosed a method of preparing a gravure printing master wherein a photosensitive imaging composition is interpositioned between two substrates to form a dual electrode imaging configuration. Upon selective exposure to electromagnetic radiation in the presence of an electric field and subsequent separation of the configuration complementary images are formed on the respective surfaces. At least one of said images may then be transferred selectively to a uniformly prepared gravure member so as to selectively occlude specific areas and produce the gravure master.

10 Claims, 7 Drawing Figures

INVENTOR.
LEWIS E. WALKUP
REXFORD W. JONES
BY Donald C. Kolasch
ATTORNEY

METHOD OF PREPARING AND UTILIZING A GRAVURE PRINTING MASTER

BACKGROUND OF THE INVENTION

This invention relates to an imaging system and more specifically to a gravure imaging system.

Gravure printing is a reproduction process wherein the printing is done from an engraved image which has been etched below the surface of the nonprinting, reference areas of a cylinder or plate. In the preparation of a conventional printing master of the line copy variety an image transparency and a gravure screen are used in successive exposures to harden a light-sensitive, acid-resistant material which has been coated on the surface of a plate. An etching solution such as ferric chloride permeates the resist material and etches the plate so as to produce recessed areas or tiny cells, a typical plate representing about 22,500 cells per square inch. The engraved plate is rotated in an ink reservoir and a doctor blade wipes the surface of the plate clean of ink while each cell retains its capacity of ink. When an impression cylinder presses a fed-in paper against the engraved plate the ink from the cells is transferred to the paper. For line copy imaging the depth of the cells is maintained substantially constant. The dot pattern formed acts as a support for the doctor blade on the gravure process thereby preventing the blade from wiping the fluid ink out of the etched depressions during the process of printing.

For continuous tone gravure printing a carbon tissue consisting of a gelatin transfer medium is first exposed in contact with a gravure screen and then a continuous tone positive is exposed in contact with the carbon tissue. Where light passes through freely, as in the lightest tones, the gelatin on the carbon tissue becomes proportionately harder than where the light is restricted. The carbon tissue thus has areas of varying light hardness. The carbon tissue is positioned on a copper plate or cylinder and the tissue developed in a tank of hot water leaving gelatin of various thickness in the square areas between the hardened screen lines. The depth of the same-size cells in the copper plate is determined in etching by the amount of light permitted to pass through the carbon tissue. In a more recent developed direct transfer technique a light-sensitive coating is first applied to the copper substrate. A screened positive is wrapped around the cylinder and exposed directly to it by a strong light source, usually through a narrow slit, as the cylinder turns. The cylinder is then developed with the coating which has not been struck by light removed. There is thereby produced a stencil or ink resistance in nonprinting areas as in other systems. This method is widely used in textile printing and the packaging industry.

While these techniques have generally been found to be useful as printing systems there are inherent disadvantages to their use. For example, in preparing gravure printing plates it is generally necessary to subject the expected printing surface to long exposure times in order to produce the surface effect desired due to the low sensitivity of the resist materials. Furthermore, it is generally necessary to subject the printing surface of the plate to various chemical treatments in order to produce the desired end result. In addition, once the image is etched into the surface of the printing plate it is permanently affixed therein to become a lasting impression of the image to be reproduced and the plate therefore is no longer reusable. Still a further disadvantage to this system is that the entire process requires considerable technical know-how and skill in order to produce satisfactory results.

It is, therefore, an object of this invention to provide a gravure duplicating system which will overcome the above noted disadvantages.

It is a further object of this invention to provide a novel method for the preparation of a gravure printing master.

Another object of this invention is to provide a printing system utilizing a novel gravure printing master.

Still a further object of this invention is to provide a duplicating system utilizing a master prepared by a noncomplex simplified imaging process.

Yet, still a further object of this invention is to provide a time saving nonexpensive process for preparing a gravure printing master.

Yet, still another object of this invention is to provide a highly flexible gravure master making system.

SUMMARY OF THE INVENTION

The foregoing objects and others are accomplished in accordance with the present invention, generally speaking, by preparing what is herein referred to as a manifold set, more fully described below. A photoresponsive imaging composition is coated on the surface of a donor substrate and a receiver sheet is placed down over the surface of the resulting imaging layer to form the manifold set or configuration. An electrical field is applied across the resulting manifold set while it is undergoing exposure selectively to an electromagnetic radiation source. Upon separation of the donor substrate and the receiver sheet the imaging or photoresponsive layer fractures along the lines defined by the light pattern to which it has been exposed with part of the imaging layer being transferred to the receiver sheet and the remainder being retained on the donor substrate so that a positive image is produced on one surface and a negative image on the other. Although not necessary, generally speaking, at least one of the donor substrate and the receiver sheet is transparent so that exposure may take place through the respective support. Either one or both may be of a conductive material. Furthermore, the manifold set may include separate conductive electrodes on opposite sides of an insulating donor substrate and an insulating receiver sheet. Here again, either or both of the combinations of electrode and support may be transparent so as to permit exposure of the imaging layer from either side of the configuration. The resulting waxy image, positive or negative, formed on the respective surface may then be pressure transferred to a uniformly preetched gravure plate and used in a conventional gravure printing mode. A gravure printing ink is applied to the surface of the resulting plate and the excess cleaned from the surface by a doctor blade. The ink remaining in the thousands of recessed cells not occluded by the waxy manifold image forms the final print by direct transfer to a receiver sheet, such as paper, upon contact.

In an alternate embodiment of the present invention, a gravure plate may be used as either the donor or receiver, in which case the gravure master may be prepared directly, eliminating the transfer step. However, under these conditions further imaging would be prevented until copying of the resulting gravure master was complete.

It has been determined that a waxy manifold image generally prepared according to the process described above may be transferred to the surface of a uniformly preetched gravure cylinder or plate and successfully acts to occlude the pores of the cylinder or plate selectively so as to provide image areas for subsequent printing. By making the proper image selection it is possible to prepare a gravure printing master capable of producing either negative or positive prints regardless of the sense of the input information. Furthermore, due to the high degree of sensitivity of the photoresponsive materials of the present invention various exposure mechanisms may be used such as projection systems, in addition to the use of contact exposure techniques.

DETAILED DESCRIPTION

In accordance with the present invention, a donor member is prepared by applying to the surface of a donor support substrate a cohesively weak photoresponsive imaging composition. Although the photoresponsive imaging composition may consist of a homogeneous layer made up of a single component or a solid solution of two or more components where the latter exhibits the desired photoresponsive and physical properties, it has generally been determined that the standard and preferred photoresponsive imaging coating be composed of a dispersion of a photosensitive pigment in a cohesively weak insulating binder matrix. Optimum results are obtained when a metal-free phthalocyanine pigment is dispersed in a wax binder material in the presence of a petroleumlike solvent such as petroleum ether. The imaging composition may be applied to the support substrate by any suitable means such as by flow coating or by a coating rod and the resulting layer dried in any suitable manner such as by the application of heat or air drying at room temperature. The final thickness of the imaging layer generally will range from about 0.5 to about 45 microns, with a thickness of from about 2 to about 35 microns generally preferred to produce the most desirable resulting gravure printing master. The basic physical property desired in the imaging layer is that it be frangible, having a relatively low level of cohesive strength either in the as coated condition or after it has been suitably activated by the introduction of a liquid activator. The ratio of photoconductive pigment to binder by volume in the dispersion or heterogeneous system may range from about 10 to 1 to about 1 to 10 but it has generally been found that proportions in the range of from about 1 to 2 to about 2 to 1 produce optimum results and accordingly constitutes the preferred range.

Following the formation of the donor member, a receiver sheet is placed over the surface of the imaging composition. Each substrate of the configuration may be a conductive component, such as conductive cellophane, but more commonly they will consist in each instance of an insulating material mounted on a conductive electrode. In an electrodeless system at least one of the donor substrate and receiver sheet is transparent and, if desirable both may be transparent so that exposure may take place from either side of the configuration. However, in those systems where the imaging composition utilized demonstrates what is considered a "memory" effect, then the specific composition may be exposed prior to becoming a part of the sandwiched configuration in which instance neither of the surface layers need be transparent. In a system wherein an electrode is employed, either or both of the combinations of electrode and substrate may be transparent so as to permit exposure of the imaging layer from either side of the manifold set. In a preferred embodiment, polyethylene terephthalate is used as the donor substrate backed up by a conductive electrode such as optically transparent glass and the receiver sheet may be a paper plate generally backed up by a receiver electrode which is usually an opaque electrode such as conductive black paper.

Following the formation of the above-described configuration, generally the receiver sheet is displaced or the manifold set opened and an activator applied to the imaging or photosensitive composition following which the configuration is reestablished. The activator may be applied before introducing the receiver sheet into the assembly, either sequence of operation being suitable for the present system. The activator material, when utilized, is applied in the form of a solvent-type liquid such as petroleum ether. However, the activation step may be eliminated if the photoresponsive layer is prepared initially so as to retain a sufficient amount of solvent following the coating step or if the imaging layer is initially fabricated so as to have a low enough cohesive strength. It is generally preferred, however, to include the activation step in the imaging process in order to produce a stronger and more permanent imaging layer which can withstand storage, thereby increasing shelf life.

Although when utilized the activator may be applied by any suitable technique such as with a brush, a smooth or rough surface roller, by flow coating, by vapor condensation or other similar methods, a very expedient approach is to spray the activator onto the surface of the imaging layer by way of an aerosol. Following the application of the activator fluid, the manifold set is closed as stated above with pressure applied to spread the activator and to ensure the necessary surface contact between the various layers. Excess activator fluid may be removed. The activator serves to create an adhesive bond between the imaging layer and the receiver sheet as well as to swell or otherwise weaken and thereby lower the cohesive strength of the imaging composition. It is desirable that the activator also have a high level of resistivity so that it will not provide an electrically conductive passage through the imaging layer and thus the latter will support the electric field which is applied during the exposure phase of the process. Accordingly, it will generally be found to be desirable to purify commercial grades of activators so as to remove impurities which might impart a higher level of conductivity than is desired to the activating fluid and thus the system. This may be accomplished by running the fluid through a clay column or by any other suitable purification technique.

Following the preparation of the manifold set, an electric field is applied across the imaging layer as it is exposed by means of electromagnetic radiation to an image pattern. Upon separation of the donor substrate from the receiver sheet the photoresponsive layer will fracture along the lines defined by the light pattern to which it has been exposed and will adhere to either the donor substrate or the receiver sheet. It is generally preferred although not mandatory that the separation be performed while the potential is still applied. Accordingly, once separation is complete, the exposed portions of the composition are retained on one of the surfaces, be it the donor substrate or the receiver sheet, while the unexposed portions are retained on the other of the two surfaces thereby resulting in the simultaneous formation of a positive image on the one hand and a negative image on the other. Whether the exposed portions are retained on the donor substrate or transferred to the receiver sheet will of course depend upon the particular photoresponsive material employed in the imaging system as well as the polarity of the applied field. The final image produced on the respective surface may then be fixed by any suitable technique such as by air evaporation of the volatile components contained in the composition or by an external application of heat. The selected manifold image is then placed into contact with the surface of a uniformly etched gravure roller or plate and the image transferred to the gravure support so as to occlude selectively the pores of the respective member.

DESCRIPTION OF DRAWINGS

The invention is further illustrated in the accompanying drawings wherein:

Referring now to FIG. 1 there is seen a donor substrate layer 11 supporting an imaging photoresponsive layer generally designated 12. In this particular illustration,, layer 12 comprises a photoresponsive pigment 13 dispersed in a binder matrix 14. Above the imaging layer 12 is placed a third or receiving layer 16. The entire combination will be termed the manifold set. In this particular embodiment of the manifold set, both the donor substrate 11 and the receiver sheet 16 are made up of electrically conductive material such as conductive cellophane, with at least one of the supports being optically transparent to provide for exposure of layer 12.

Although the structure of FIG. 1 represents one of the simplest forms which the manifold configuration may take an alternate and preferred embodiment is illustrated in FIG. 2. In this illustration there is represented an insulating donor substrate 21 having coated on its surface the imaging layer generally designated 22. As in FIG. 1 the imaging layer may take on any one of several forms as described in the discussion above. However, for purposes of illustration it is shown as consisting of photoresponsive particles dispersed in a binder matrix 24. Superimposed upon the imaging layer is the receiver sheet 26. The insulating donor substrate 21 is backed with a conductive electrode 25 while the image receiver sheet 26 of the manifold set is also backed with a conductive electrode 27. FIG. 3 illustrates the effect obtained when the manifold set of FIG. 2 is selectively exposed to radiant energy represented by lines 29 while an electric field resulting from potential source 30 is established across the sandwich configuration. As a result of the particular properties of the imaging composition or matrix 22 the layer fractures along lines subject to the electromagnetic radiation thereby producing upon separation a manifold image 32 on the receiver sheet 26 while the complementary or background areas are retained in image form 31 on the donor substrate 21. Thus, if the image input sense is positive then a negative image will be formed on the receiver sheet when this sheet is stripped from the configuration.

In FIG. 4 a gravure substrate herein represented as a copper sheet 41 uniformly preetched in a gravure screen pattern of about 120 lines per inch is superimposed upon the negative manifold image 32 produced on the surface of the receiver sheet 26 as a result of the exposure system illustrated in FIG. 3. Pressure is applied in a manner demonstrated by pressure roller 42. FIG. 5 represents the separation phase of the transfer process whereby the gravure substrate 41 is separated from the manifold image 32 and the receiver sheet 26 resulting in the occlusion of the pores of the gravure plate so as to produce the printing master of the present invention.

Figure 1:
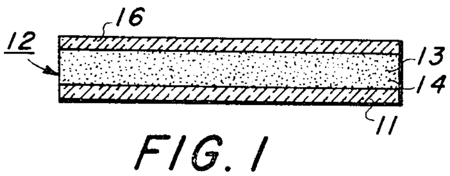
FIG. 1 is a side sectional view of a photosensitive imaging member of the present invention.
Figure 2:
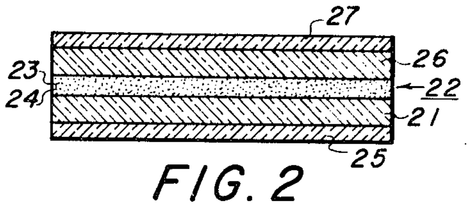
FIG. 2 is a side sectional view of an alternate and preferred embodiment of the imaging member configuration of the present invention.
Figure 3:
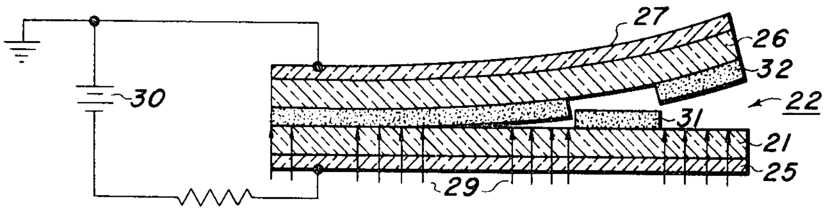
FIG. 3 is a side sectional view illustrating exposure and the resulting effect upon the photoresponsive layer of the imaging member of FIG. 2.
Figure 4:
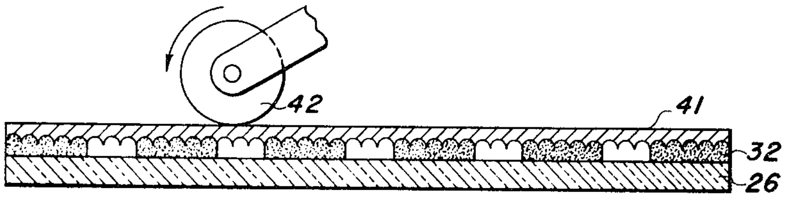
FIGS. 4 and 5 represent one method of transferring the manifold image to the surface of a gravure substrate.
Figure 5:
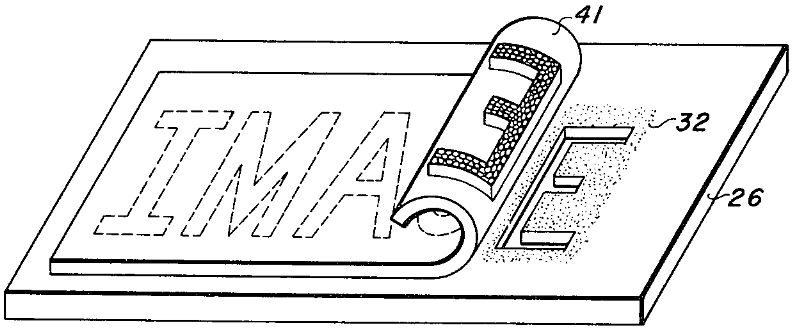

Any suitable transfer technique may be used such as the pressure transfer approach taught in FIG. 4 or a light-activated transfer process wherein a sandwich configuration consisting of the imaged member and a conductive gravure support is prepared. While applying a potential across the resulting configuration the imaged member is simultaneously flooded with light. When used this process requires the use of a transparent or translucent image support so as to allow for the passage of the light during the transfer phase of the process.

Figure 6:
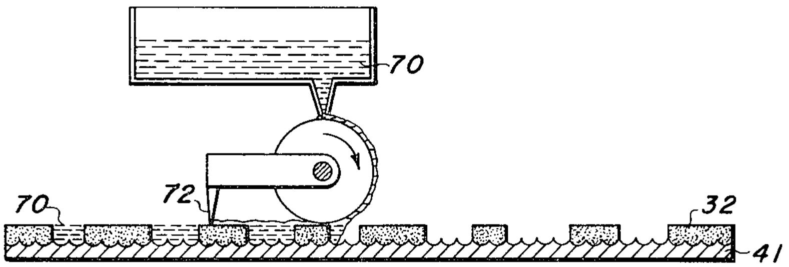
FIG. 6 represents the inking phase of the gravure printing process herein described.
Figure 7:
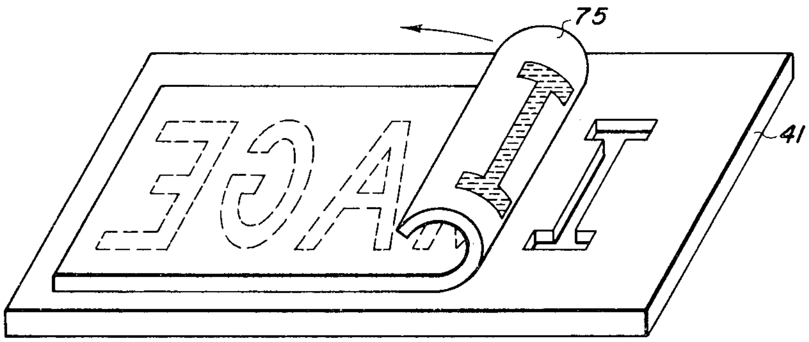
FIG. 7 represents the printing step in the invention process.

In the sectional view of FIG. 6 a gravure ink 70 is applied to the surface of the gravure plate 41 with the ink filling the pores of the gravure plate in those areas where the waxy manifold image 32 is not present. The gravure surface will generally present a uniformly porous surface of the type conventionally used in gravure printing with 120–150 lines per inch being a representative cross section of the type of gravure cylinders or plates used in the art. The excess ink is wiped off the surface by a doctor blade 72 and the ink remaining in the thousands of recess cells not occluded by the waxy manifold image transferred directly to copy paper 75 as in FIG. 7, upon contact with the gravure plate 41. If desired, that portion of the image material which fills the pores above the plate surface may be removed.

Any suitable gravure ink may be used in the course of the present invention. Gravure inks are rapid-drying fluid inks which have sufficient body to be pulled from the engraved wells in the cylinder or plate. Gravure printing inks consist generally of three essential ingredients, the pigment, dictated by color requirements, the binder, which serves to tie the pigment to the printing surface and the solvent which reduces the consistency of the pigment and binder to the proper proportions desired. The plate generally comprises any suitable material such as a metallic substratelike copper or steel. Plastics have also been utilized as well as cylinders coated with selected resins. Photopolymers may also be found useful in the preparation of the gravure printing plate.

It is to be understood that any suitable photoresponsive material may be employed in the course of the present invention with the choice depending largely upon the photosensitivity and spectral sensitivity desired, the degree of contrast desired in the final image, whether a heterogeneous or a homogeneous system will be used and similar considerations. Typical photoresponsive materials include: substituted and unsubstituted phthalocyanine, quinacridones, zinc oxide, mercuric sulfide, Algol yellow (C. I. No. 67,300), cadmium sulfide, cadmium selenide, Indofast brilliant scarlet toner (C. I. No. 71,140), zinc sulfide, selenium, antimony sulfide, mercuric oxide, indium trisulfide, titanium dioxide, arsenic sulfide, $Pb_3O_4$, gallium triselenide, zinc cadmium sulfide, lead iodide, lead selenide, lead sulfide, lead telluride, lead chromate, gallium telluride, mercuric selenide, and the iodides, sulfides, selenides and tellurides of bismuth aluminum and molybdenum. Others include the more soluble organic photoresponsive materials (which facilitate the fabrication of homogeneous systems) especially when these are complexed with small amounts (up to about 5 percent) of suitable Lewis acids. Typical of these organic photoresponsive pigments are 4,5-diphenylimidazolidinone; 4,5-diphenylimidazolidinethione; 4,5-bis-(4'-amino-phenyl)-imidazolidinone; 1,5-dicyanonoaphthalene; 1,4-dicyanonaphthalene; aminophthalodinitrile; nitrophthalidinitrile; 1,2,5,6-tetraazacyclooctatetraene-(2,4,6,8); 3,4-di-(4'-methoxy-phenyl)-7,8-diphenyl-1,2,5,6-tetraazacyclooctatetraene-(2,4,6,8); 3,4-di-(4'-phenoxy-phenyl-7,8-diphenyl-1,2,5,6-tetraaza-cyclooctatetraene- (2,4,6,8); 3,4,7,8-tetramethoxy-1,2,5,6-tetraazacyclooctatetraene-(2,4,6,8); 2-mercapto-benzthiazole; 2-phenyl-4-diphenyl-idene-oxazolone; 2-phenyl-4-p-methoxybenzlidene-oxazolone; 6-hydroxy-2-phenyl-3-(p-dimethylamino phenyl)-benzofurane; 6'-hydroxy-2, 3-di-(p-methoxyphenyl)-benzofurane; 2,3,5,6-tetra-(p-methoxyphenyl)-furo-(3,2f)-benzofurane; 4-dimethylaminobenzylidene-benzhydrazide; 4-dimethylaminobenzylideneisonicotinic acid hydrazide; furfurylidene-(2)-4'-dimethylaminobenzhydrazide; 5-benzilidene-amino-acenaphthene; 3-benzylidene-amino-carbazole; (4-N,N-dimethylamino-benzylidene)-p-N,N-dimethylaminoaniline; (2-nitro-benzylidene)-p-bromo-aniline; N,N-dimethyl-N'-(2-nitro-4-cyano-benzylidene)-p-phenylene-diamine; 2,4-diphenyl-quinazoline; 2-(4'-amino-phenyl)-4-phenyl-quinazoline; 2-phenyl-4 -(4'-di-methyl-amino-phenyl)-7-methoxy-quinazoline; 1,3 -diphenyl-tetrahydroimidazole; 1,3-di(4'-chlorophenyl)-tetrahydroimidazole; 1,3-diphenyl-2-4'-dimethyl amino phenyl)-tetrahydroimidazole; 1,3-di-(p-tolyl)-2-[quinolyl-(2'-)]-tetra-hydroimidazole; 3-(4'-dimethylamino-phenyl)-5-(4''-methoxy-phenyl-6-phenyl-1,2,4-triazine; 3-pyridil-(4')-5-(4''-dimethyl-amino-phenyl)-6-phenyl-1,2,4-triazine; 3,(4'-amino-phenyl)-5,6-di-phenyl-1,2,4-triazine; 2,5-bis[4'-amino-phenyl-(1')]-1,3,4,-triazole; 2,5-bis[4'-(N-ethyl-N-acetyl-amino)-amino)-phenyl-(1')]-1,3,4-triazole; 1,5dipbenyl-3-methyl-pyrazoline; 1,3,4,5-tetraphenyl-pyrazoline; 1-methyl-2-(3'4'-dihydroxy-methylene-phenyl)-benzimidazole; 2-(4'-dimethylamino phenyl)-benzoxazole; 2-(4'-methoxyphenyl)-benzthazole; 2,5-bis-[p-aminophenyl-(1)]-1,3,4-oxidiazole; 4,5-diphenyl-imidazolone; 3-aminocarbazole; copolymers and mixtures thereof. Any suitable Lewis acid (electron acceptor) may be employed under complexing conditions with many of the aforementioned more soluble organic materials and also with many of the more insoluble organics to impart very important increases in photosensitivity to those materials. Typical Lewis acids are 2,4,7-trinitro-9-fluorenone; 2,4,5,7-tetranitro-9-fluorenone; picric acid; 1,3,5-trinitro-benzene chlorani; benzo-quinone; 2,5-dichlorobenzoquinone; 2-6-dichlorobenzo-quinone; chloranil; naphthoquinone-(1,4); 2,3-dichloronaphthoquinone (1,4); anthraquinone; 2-methyl-anthraquinone; 1,4-dimethyl-anthra-quinone; 1-chloroanthraquinone; anthraquinone-2-carboxylic acid; 1,5-dichloroanthraquinone; 1-chloro-4-nitroanthraquinone; phenanthrene-quinone; acenaphthene-quinone; pyranthrenequinone; chrysene-quinone; thio-naphthene-quinone; anthraquinone-1,8-disulfonic acid and anthraquinone-2-aldehyde; triphthaloyl-benzene-aldehydes such as bromal, 4-nitrobenzaldehyde; 2,6-di-chlorobenzaldehyde-2, ethoxy-1-naphthaldehyde; anthracene-9-aldehyde; pyrene-3-aldehyde; oxindole-3-aldehyde; pyridine-2,6-dialdehyde, bipbenyl-4-aldehyde; organic phosphonic acids such as 4-chloro-3-nitro-benzene-phosphonic acid; nitrophenols, such as 4-nitrophenol and picric acid; acid anhydrides, for example, acetic-anhydride, succinic anhydride, maleic anhydride, phthalic anhydride, tetrachloro-phthalic anhydride, perylene 3,4,9,10-tetracarboxylic acid and chrysene-2,3,8,9-tetracarboxylic acid anhydride, di-bromo maleic acid anhydride; metal-halides of the metals and metalloids of the groups IB, VII B, II A–VA and group VIII of the periodical system, for example: aluminum chloride, zinc chloride, ferric chloride, tin tetrachloride (stannic chloride), arsenic trichloride, stannous chloride, antimony pentachloride, magnesium chloride, magnesium bromide, calcium bromide, calcium iodide, strontium bromide, chromic bromide, manganous chloride, cobaltous chloride, cobaltic chloride, cupric bromide, ceric chloride, thorium chloride, arsenic tri-iodide; boron halide compounds, for example: boron trifluoride and boron trichloride; and ketones, such as acetophenone, benzophenone, 2-acetyl-naphthalene, benzil, benzoin, 5-benzoyl acenaphthene, biacene-dione, 9-acetyl-anthracene, 9-benzoyl-anthracene, 4-(4-dimethylamino-cinnamoyl)-1-acetylbenzene, acetoacetic acid anilide, indandione-(1,3),-(1-3-diketo-hydrindene), acenaphthene quinone-dichloride, anisil 2,2-pyridil, furil; mineral acids such as the hydrogen halides, sulfuric acid and phosphoric acid; organic carboxylic acids, such as acetic acid and the substitution products thereof such as monochloro-acetic acid, dichloroacetic acid, trichloro-acetic acid, phenylacetic acid, and 6-methyl-coumarinylacetic acid (4), maleic acid, cinnamic acid, benzoic acid, 1-(4'diethyl-amino-benzoyl)-benzene- 2-carboxylic acid, phthalic acid, and tetrachlorophthalic acid, alpha-beta-dibromo-beta-formyl-acrylic acid (mucobromic acid), dibromo-maleic acid, 2-bromo-benzoic acid, gallic acid, 3-nitro-2-hydroxyl-1-benzoic acid, 2-nitro phenoxy-acetic acid, 2-nitro-benzoic acid, 3-nitro benzoic acid, 4-nitro-benzoic acid, 3-nitro-4-ethoxy-benzoic acid, 2-chloro-4-nitro-1-benzoic acid, 2-chloro-4-nitro-1-benzoic acid, 3-nitro-4-methoxy-benzoic acid, 4-nitro-1-methyl-benzoic acid, 2-chloro-5-nitro-1-benzoic acid, 3-chloro-6-nitro-1-benzoic acid, 4-chloro-3-nitro-1-benzoic acid, 5-chloro-3-nitro-2-hydroxy-benzoic acid, 4-chloro-2-hydroxy-benzoic acid, 2,4-dinitro-1-benzoic acid, 2-bromo-5-nitro-benzoic acid, 4-chloro-phenyl acetic acid, 2-chloro-cinnamic acid, 2-cyano-cinnamic acid, 2,4-dichloro-benzoic acid, 3,5-dinitro-benzoic acid, 3,5-dinitro-salycylic acid, malonic acid, mucic acid, acetosalycylic acid, benzilic acid, butane-tetra-carboxylic acid, citric acid, cyano-acetic acid, cyclo-hexane-dicarboxylic acid, cyclo-hexane-carboxylic acid, 9,10-dichloro-stearic acid, fumaric acid, itaconic acid, levulinic acid (levulic acid); malic acid, succinic acid, alpha-bromo-stearic acid, citraconic acid, dibromo-succinic acid, pyrene-2,3,7,8-tetra carboxylic acid, tartaric acid; organic sulfonic acid, such as 4-toluene sulfonic acid, and benzene sulfonic acid, 2,4-dinitro-1-methyl-benzene-6-sulfonic acid, 2,6-dinitro-1-hydroxy-benzene-4-sulfonic acid and mixtures thereof.

In addition, other photoresponsive compositions may be formed by complexing one or more suitable Lewis acids with polymers which are ordinarily not thought of as photoresponsive. Typical polymers which may be complexed in this manner include the following illustrative materials: polyethylene terephthalate, polymides, polyimides, polycarbonates, polyacrylates, polymethymethacrylates, polyvinyl fluorides, polyvinyl chlorides, polyvinyl acetates, polystyrene, styrene-butadiene copolymers, polymethacrylates silicone resins, chlorinated rubber, and mixtures and copolymers thereof where applicable; thermosetting resins such as epoxy resins, phenoxy resins, phenolics epoxy-phenolic copolymers, epoxy urea formaldehyde copolymers, epoxy melamine-formaldehyde copolymers and mixtures thereof, where applicable. Other typical resins are epoxy esters, vinyl epoxy resins, tall-oil modified epoxies, and mixtures thereof where applicable.

It is also to be understood in connection with the heterogeneous system that the photoresponsive particles themselves may consist of any suitable one or more of the aforementioned photoresponsive pigments, either organic or inorganic, dispersed in, in solid solution in, or copolymerized with any suitable insulating resin whether or not the resin itself is photoresponsive. This particular type of resin may be particularly desirable to facilitate dispersion of the particle, to prevent undesirable reactions between the binder and the photoresponsive pigment or between the photoresponsive pigment and the activator, and for other similar purposes. Typical resins of this nature include polyethylene, polypropylene, polyamides, polymethacrylates, polyacrylates, polyvinyl chlorides, polyvinyl acetates, polystyrene, polysiloxanes, chlorinated rubbers, polyacrylonitrile, epoxies, phenolics, hydrocarbon resins and other natural resins such as rosin derivatives as well as mixtures and copolymers thereof.

As stated above, the photoresponsive or imaging layer generally should have a relatively low cohesive strength either in the as coated condition or following activation. This, of course, is true for both the homogeneous systems and the heterogeneous systems. One technique for achieving low cohesive strength in the imaging layer is to employ relatively weak, low molecular weight materials therein. Thus, for example, in a single component, homogeneous layer, a monomeric compound or a low molecular weight polymer complexed with a Lewis acid to impart a high level of photosensitivity to the layer may be employed. Similarly, when a homogeneous layer utilizing two or more components in solid solution is selected to make up the donor layer either one or both of the components of the solid solution may be a low molecular weight material such that the layer has the desired low level of cohesive strength. This approach may also be taken in conjunction with the preparation of a heterogeneous imaging layer. Although the binder material in the heterogeneous system may in itself be photosensitive, it is not necessary that it have this property so that materials such as microcrystalline wax, paraffin wax, low molecular weight polyethylene and other low molecular weight polymers may be selected for use as the binder material solely on the basis of physical properties and the fact they are insulating materials, without regard to their photoresponsiveness. This is also true of the two component homogeneous system where nonphotoresponsive materials with the desired physical properties may be used in solid solution with photoresponsive material. Any other suitable technique for achieving low cohesive strength in the imaging layer of the present system may also be employed. For example, suitable blends of incompatible materials such as a blend of a polysiloxane resin with a polyacrylic ester resin may be used either as a binder layer in a heterogeneous system or in conjunction with a homogeneous system in which the photoresponsive material may be either one of the incompatible components complexed with a Lewis acid or a separate and additional component of the layer.

While as stated above either one or both of the donor support substrate and receiving sheet or substrate may be conductive in nature such as conductive cellophane the use of such flexible, transparent conductive materials for the most part will furnish a relatively weak support. Therefore, the use of an insulating donor substrate and receiver sheet backed up in each instance by a working electrode allows for the use of high-strength insulating polymers such as polyethylene, polypropylene, polyethylene terephthalate (Mylar), cellulose acetate, Saran, a vinyl chloride-vinylidene chloride copolymer and similar materials. Not only does the use of this type of high strength polymer provide a strong substrate for the manifold images formed on the donor substrate and receiver sheet but in addition it provides an electrical barrier between the electrodes and the imaging layer which tends to inhibit electrical breakdown of the system. When the gravure master is prepared directly the receiver sheet will take the form of a porous support suitable for forming a gravure master such as an etched copper plate as set out above. Further, structural combinations of the manifold set are more fully described in copending U.S. Pat. application Ser. No. 452,641, (now abandoned) filed May 3, 1965, having a common assignee.

Any suitable activator agent may be employed during the course of the present invention. Generally speaking, the activator may consist of any suitable solvent having properties as set out above and which has the above described effect on the imaging or donor layer. For purposes of this invention the term "solvent" shall be understood to include not only materials which are conventionally thought of as solvents but also those which are thought of as partial solvents, swelling agents or softening agents for the imaging layer. It is generally preferred that the activator solvents have a relatively low boiling point so that fixing of the resulting duplicating image may be accomplished by solvent evaporation, with a very mild application of heat, if necessary. It is to be understood, however, that the invention is not limited to the use of these relatively volatile activators. In fact, very high boiling point, nonvolatile activators, including silicone oils such as dimethyl polysiloxanes and very high boiling point long chain aliphatic hydrocarbon oils ordinarily used as transformer oils such as Wemco-C transformer oil, available from Westinghouse Electric Co., have also been successfully utilized in the imaging process. Generally, speaking, therefore, any suitable volatile or nonvolatile solvent activator may be employed. Typical solvents include Sohio Odorless Solvent 3440, an aliphatic (kerosene) hydrocarbon fraction commercially available from Standard Oil Co. of Ohio, carbon tetrachloride, petroleum ether, Freon 214 (tetrafluorotetrachloropropane), other halogenated hydrocarbons such as chloroform, methylene chloride, trichloroethylene, perchloroethylene, chlorobenzene, trichloromonofluoro methane, tetrachloro difluoroethane, trichlorotrifluoroethane, amides such as formamide, dimethyl formamide, esters such as ethyl acetate, isopropyl acetate, butyl acetate, amyl acetate, cyclohexyl acetate, isobutyl propyanate and butyl lactate, ethers such as diethyl ether, diisopropyl ether, dioxane, tetrahydrofuran, ethylene glycol monoethyl ether, aromatic and aliphatic hydrocarbons such as benzene, toluene, xylene, hexane, cyclohexane, gasoline, mineral spirits and white mineral oil, ketones such as acetone, methylethyl ketone, methyl isobutyl ketone, and cyclohexanone and vegetable oils such as coconut oil, bamboo bassu oil, palm oil, olive oil, castor oil, peanut oil, neats foot oil, and mixtures thereof.

With respect to the exposure phase of the process of the present invention an electrical field is applied across the manifold set as it is exposed to the image to be reproduced. By preparing the imaging configuration in such a manner that the initial degree of adherence of the donor layer to the donor support is only slightly higher than that of the donor layer to the receiving substrate, the imaging layer will remain on the donor substrate unless the combined effect of exposure and applied field are added to the bond strength of the receiving sheet and the donor layer thereby exceeding the strength of the bond between the donor layer and the donor support substrate. In this way an amplification effect is achieved and transfer may be effected with relatively low levels of light exposure. The application of the required electrical field is relatively straightforward, generally falling within a range across the imaging layer of from about 1,000 to about 25,000 volts per mil, with a preferred field strength in the range of from about 1,500–2,000 volts per mil. With some materials there is a preferred polarity orientation. Thus, for example, with an imaging layer made up of finely divided metal-free phthalocyanine particles dispersed in a microcrystalline wax, it has been determined that the best images generally are formed when the illuminated electrode backing of the donor support substrate is made positive and the nonilluminated receiving sheet backing electrode negative.

A visible light source, an ultraviolet light source or any other suitable source of actinic electromagnetic radiation may be used to expose the manifold set of the present invention. Higher quality images are obtained by exposing from the donor side of the imaging layer, and accordingly, the receiver sheet is usually separated from the remaining layers of the manifold set just after image exposure and generally with the power still being supplied to both electrodes. However, short delays in separation after the exposure step do not appear to have deleterious effects on the images produced. Essentially the same results are obtained when separation is made after the power to the system is turned off, but, generally, the images are somewhat poorer in quality. Exposure parameters such as the magnitude of the applied potential and the like may be found in the above mentioned copending U.S. Pat. application Ser. No. 452,641.

If a relatively volatile activator is employed, such as petroleum ether, carbon tetrachloride or Freon 215, fixing of the duplicating image occurs almost instantaneously inasmuch as a relatively small amount of the activator is present. With somewhat less volatile activators, such as the Sohio Odorless Solvent 3440 or Freon 214, described above, fixing may be accelerated by blowing air over the images or warming them to a temperature of about 150° F., whereas with the even less-volatile activators, such as transformer oil, fixing is accomplished by a blotting effect which may be supplied by an accessory substrate. In addition to the above disclosed fixing techniques any other suitable method may be employed which will occur to those skilled in the art.

PREFERRED EMBODIMENTS

To further define the specifics of the present invention, the following examples are intended to illustrate and not limit the particulars of the present system. Parts and percentages are by weight unless otherwise indicated. The examples are also intended to illustrate various preferred embodiments of the present invention.

EXAMPLES I & II

A commercial, metal-free phthalocyanine is first purified by acetone extraction to remove organic impurities. Since this extraction step yields a less-sensitive beta crystalline form, the desired alpha form is obtained by dissolving 100 grams of the beta form in 600 cc. of sulfuric acid, precipitating it by pouring the solution into 3,000 cc. of ice water and washing with water to neutralize. The resulting purified alpha phthalocyanine is salt milled for 6 days and desalted by slurring in distilled water, vacuum filtering, water washing and finally methanol washing until initial filtrate is clear to produce the *x*-form phthalocyanine. After vacuum drying to remove residual methanol, the *x*-form phthalocyanine thereby produced is used to prepare the imaging layer according to the following procedure: 2 grams of Paraflint RG wax, a microcrystalline wax available from Moore and Munger Inc. having a melting point of about 214° F., and 0.5 grams of Sunoco 5825, a microcrystalline wax with a melting point of about 150° F. is blended with a tri-mixture of 1.25 grams of the above purified x-form metal-free phthalocyanine, 0.8 grams Watchung Red B, 1-(4′-methyl-5′-chloroazobenzene-2′-sulfonic acid)-2-hydroxy-3-naphthoic acid, C.I. No. 15865, commercially available from E. I. duPont de Nemours & Co. and 1.25 grams Algol Yellow GC, 1,2,5,6-di(C,C′-diphenyl)-thiazole-anthraquinone, C.I. No. 67300, commercially available from General Dyestuffs, in 60 cc. of reagent grade petroleum ether. This formulation is added in a 1 pint wide-mouth glass jar together with a one-half pint volume and one-half inch diameter porcelain balls. The jar lid is lined with a 5 mil Teflon coating to avoid contamination and the lid screwed on the jar which serves as a ball mill container. The jar is wrapped with a black vinyl electrical pressure-sensitive tape, type No. 33, available from Minnesota Mining and Manufacturing Corp. to protect the mill jar from shock and to shield the mill jar contents from light. This formulation is then ball milled at a rate of about 90 r.p.m. for about 24 hours. Following the 24-hour milling an additional 20 cc. of the petroleum ether is added. The mill is then rotated another 15 minutes after the addition of the second increment of the ether. A uniform coating of the resulting paste is applied to the top side of a 2-mil thick Mylar film using a No. 10 wire-wound drawdown rod to produce a donor sheet. The coating is air dried at room temperature for about 5 minutes. The imaging coating is measured to be about 2.5 microns thick. The air dried donor sheet is then fastened, donor coating facing up, to the electrically conductive surface of a transparent NESA glass electrode. About 1 cc. of a 5 percent activator solution of Piccotex 100, a styrene copolymer, in Sohio Odorless Solvent 3440, a kerosene fraction commercially available from Standard Oil of Ohio is applied in a bead along one edge of the horizontal donor sheet. A second 2-mil thick Mylar sheet is placed over the donor coating bearing the bead of activator solution and the activator solution is spread uniformly over the donor coating by rolling a 1-inch diameter and 6-inch long rubber roller once across the 2-mil Mylar receiver sheet. A sheet of electrically conductive black paper, the latter serving as the opaque electrode in the system, is laid over the second Mylar receiver sheet. A potential of about 10,000 volts is applied through a 1,250 meg-ohm resistor across the transparent and opaque electrodes with the NESA glass made the positive pole and the black conductive paper the negative pole. About 5 seconds after the electric field power is turned on the manifold set is exposed to a light image by projecting a positive image upward through the transparent NESA electrode. The exposure is about 0.05 foot-candle illumination from an incandescent lamp about 2800K for a duration of about 4 seconds, making a total incident energy of about 0.20 foot-candle-seconds. About 3 seconds after the light exposure step, the receiver Mylar sheet and the opaque electrode are peeled off manually while the full 10,000-volt potential is still applied. Following separation a copy of the original positive is observed on the Mylar donor substrate and a reversal or negative of the original positive is observed on the Mylar receiving sheet. Both manifold images are fixed by warming to a temperature of about 160° F. on a hot plate. Each of the manifold images is placed in contact with a preetched gravure copper plate having about a 120 line grid and passed at about 1 inch per second between steel rolls about 3 inches in diameter and spring loaded with an interroll force of about 1,600 pounds. The total force applied is about 800 pounds per linear inch. An imprint of each image is thereby pressure transferred to its respective gravure plates. Each imaged gravure printing plate is then used to reproduce both positive and negative prints by utilizing conventional gravure printing inks and copy paper.

EXAMPLES III & IV

A donor paste is prepared according to the process of examples I and II and a uniform coating of the paste applied to a 2-mil Mylar donor substrate mounted on a NESA electrode. The donor coating is activated with a 5 solution of the Piccotex 100 resin in a Sohio 3440 Solvent described in the above examples and a Mylar receiver sheet is placed over the activated donor layer. The receiver sheet is backed up by an opaque black conductive paper. When closure of the manifold set is complete, 7,000 volts are applied across the transparent and opaque electrode complex through a 51 meg-ohm resistor. Again, as in examples I and II, the NESA glass serves as the positive electrode and the opaque electrode as the negative pole. About 5 seconds after the power is turned on the manifold set is exposed to a light image by projecting a positive image upward through the transparent NESA electrode. The exposure is about 0.05 foot-candles from an incandescent lamp for a duration of about 5 seconds, making a total incident energy of about 0.25 foot-candle-seconds. About 3 seconds after the light exposure step, the receiver Mylar sheet and opaque electrode are peeled off manually while the full potential is still applied. Following separation, a copy of the original positive is observed on the Mylar receiver sheet. Both manifold images are again fixed by warming to a temperature of about 160° F. on a hot plate. Each of the manifold images is placed in contact with a gravure copper plate as in examples I & II and an imprint of each image pressure transferred to the surface of the respective plates.

EXAMPLE V

Five grams of Sunoco 1290 microcrystalline wax having a melting point of about 160° F. is blended with a trimixture of 3 grams of *x*-form metal-free phthalocyanine as prepared in example I, 2 grams of Watchung Red B and 1 gram of Benzidene Yellow type 30–0535, commercially available from Hilton Davis Corp. in 100 cc. of clay bed purified reagent grade petroleum ether. This formulation is ball milled at a rate of about 90 r.p.m. for about 20 hours. The resulting paste is heated to a temperature of about 150° F. and then cooled back to room temperature. A uniform coating of the resulting paste is then applied to the surface of a 2-mil thick Mylar film using a No. 6 wire-wound drawdown rod to produce an imaging coating about 2.5 microns thick. The coating is air dried at room temperature for about 5 minutes. The air-dried donor sheet is then fastened as in the above examples to a NESA glass electrode and the surface of the donor composition activated by applying a bead of Dow Corning silicone 200, with a viscosity of about 0.65 centistokes, as the activator along one edge of the donor. The donor composition is covered with a copper gravure substrate and a rubber roller, passed across the top surface thereby distributing the activator uniformly over the donor composition. A sheet of electrically conductive black paper is laid over the gravure substrate to serve as the opaque electrode in the system. A potential of about 3,000 volts is applied through a 51 meg-ohm resistor across the electrode system with the NESA glass made the positive pole and the black conductive paper the negative pole. Above 5 seconds after the electric field is turned on, the manifold set is exposed to a light image by projecting a positive image upward through the transparent NESA electrode. The exposure is about 0.10 foot-candles for about 5 seconds. About 3 seconds after the light exposure step, the copper receiver sheet and the opaque electrode are peeled off while the voltage potential is still applied. A negative manifold image is observed on the surface of the copper substrate. The resulting image is fixed by warming to a temperature of about 160° F. on a hot plate. This example demonstrates the direct mode of preparing a gravure printing master with a waxy manifold image on the surface of a copper gravure substrate.

Although the present examples are specific in terms of conditions and materials used, any of the above listed typical materials may be substituted when suitable in the above examples with similar results. In addition to the steps used to prepare the gravure printing master of the present invention, other steps or modifications may be used, if desirable. For example, during the procedure wherein the donor paste is heated and cooled after milling but prior to coating, the cooling step may be executed in a manner so as to shock the donor composition. Thus, this cooling step may be carried out either gradually or instantaneously. In addition, other materials may be incorporated in the photosensitive material, binder, donor sheet, receiver sheet or gravure substrate which will enhance, synergize or otherwise desirably effect the properties of these materials for their present use. For example, increased manifold image durability and hardness may be achieved by treatment with a hardening agent or with a hard polymer solution which will wet the image material but not the subs,rate.

Anyone skilled in the art will have other modifications occur to him based on the teachings of the present invention. These modifications are intended to be encompassed within the scope of this invention.

What is claimed is:

1. A method of preparing a gravure printing master which comprises selec,ively exposing at least one surface of a manifold configuration to actinic radiation, said surface being transparent to said radiation, said manifold configuration comprising a waxy, frangible, cohesively weak photoresponsive imaging composition comprising a dispersion of photosensitive pigment particles in a waxy insulating binder matrix interpositioned between a donor substrate and a receiver sheet, simultaneously developing an electric field across said manifold configuration while it is exposed to said actinic radiation thereby causing said photoresponsive composition to fracture in response to said radiation along the lines defined by said selective exposure upon separating said receiver sheet from said manifold configuration, said receiver sheet having adhered to its surface in an imagewise configuration a waxy image of said photoresponsive material and said donor substrate having adhered to its surface an image complementary to that on said receiver sheet and contacting the image bearing surface of at least one of said receiver sheet and donor substrate with the surface of a uniformly etched gravure member in such a manner so as to selectively transfer portions of said image and occlude the cells of said gravure member in imagewise configuration to produce said master.

2. The process as disclosed in claim 1 wherein said exposing step is carried out through said donor substrate and said gravure member comprises a uniformly etched copper substrate.

3. The process as disclosed in claim 1 wherein said transfer step is light activated.

4. The process as disclosed in claim 1 wherein said transfer step is effected by the external application of pressure.

5. The process as disclosed in claim 1 wherein said transfer step is effected by external application of heat.

6. A method of preparing a gravure printing master which comprises applying an activating solution to a waxy, frangible, cohesively weak photoresponsive imaging composition coated on the surface of a donor support substrate, said composition comprising a dispersion of photosensitive pigment particles in a waxy insulating binder matrix, placing a receiver sheet over said photoresponsive composition, exposing said photoresponsive composition to a pattern of actinic radiation through at least one surface of said donor substrate and receiver sheet while simultaneously applying an electric field across said photoresponsive composition, said surface through which the exposure is made being transparent to said actinic radiation, separating said receiver sheet from said donor substrate whereby the exposed portion of said imaging composition is retained on one of said donor substrate and receiver sheet while the unexposed portion is retained on the other and contacting the image bearing surface of at least one of said donor substrate and receiver sheet with the surface of a uniformly etched gravure member such that a portion of the respective image is transferred to said gravure member in an imagewise manner so as to selectively occlude the cells of said gravure member to produce said master.

7. A method of making multiple copies from a gravure printing master which comprises:

a. selectively exposing at least one surface of a manifold configuration to actinic radiation said surface being transparent to said radiation, said manifold configuration comprising a waxy, frangible, cohesively weak photoresponsive imaging composition interpositioned between a donor substrate and a receiver sheet, b. simultaneously developing an electric field across said manifold configuration while it is exposed to said actinic radiation thereby causing the photoresponsive composition to fracture in response to said radiation, c. separating said receiver sheet from said donor substrate said receiver sheet having adhered to its surface in imagewise configuration an image of said photoresponsive material and said donor substrate having adhered to its surface an image complementary to that on said receiver sheet, d. contacting at least one of said images on said donor substrate and receiver sheet with the surface of a uniformly etched gravure member so as to transfer an imprint of said image thereto thereby selectively occluding the cells of said uniformly etched gravure member, e. developing said member with a gravure ink, f. contacting said member with a surface of a transfer sheet thereby transferring the gravure ink in imagewise configuration to said transfer sheet, and g. repeating steps (e) and (f) at least one additional time.

8. A method of preparing a gravure printing master which comprises selectively exposing at least one surface of a manifold configuration comprising a waxy, frangible, cohesively weak photoresponsive imaging composition interpositioned between a donor substrate and a uniformly etched gravure receiver sheet to electromagnetic radiation, said surface being transparent to said radiation, simultaneously developing an electric field across said manifold configuration while it is exposed to said electromagnetic radiation thereby causing said photoresponsive composition to fracture in response to said radiation, and then separating said receiver sheet from said manifold configuration, said receiver sheet having adhered to its surface in an imagewise manner a waxy image of said photoresponsive material to produce said master.

9. The method as described in claim 8 wherein said exposure step is carried out through said donor substrate and said receiver sheet comprises a uniformly etched copper substrate.

10. The process as disclosed in claim 8 further including the steps of developing said gravure receiver sheet supporting said waxy image with a gravure ink, contacting said inked surface with a transfer sheet and repeating said inking and transfer steps at least once.

* * * * *